United States Patent [19]
Dirschl et al.

[11] Patent Number: 5,562,761
[45] Date of Patent: Oct. 8, 1996

[54] COMPOSITIONS, CONTAINING ORGANIC SILICON COMPOUNDS, FOR THE TREATMENT OF FIBRE MATERIALS

[75] Inventors: Franz Dirschl, München; Harald Chrobaczek, Augsburg; Rainer Augart, Thierhaupten; Hans-Ludwig Kienle, Augsburg; Jürgen Uhl, Laugna, all of Germany

[73] Assignee: Ciba-Geigy Corporation, Tarrytown, N.Y.

[21] Appl. No.: 579,640

[22] Filed: Dec. 27, 1995

Related U.S. Application Data

[63] Continuation of Ser. No. 303,906, Sep. 9, 1994, abandoned.

[30] Foreign Application Priority Data

Sep. 13, 1993 [DE] Germany ................ 43 30 967.4

[51] Int. Cl.$^6$ .................... C08G 77/04; D06M 13/50; C09K 3/18
[52] U.S. Cl. .................... 252/8.62; 106/287.11; 106/287.12; 106/287.13; 106/287.14; 106/287.15; 106/287.16; 106/2; 427/387; 427/389; 427/389.9; 525/477; 525/478; 528/33; 528/34; 528/37; 528/38
[58] Field of Search ................ 106/2, 287.11, 106/287.12, 287.13, 287.14, 287.15, 287.16; 252/8.6, 8.8; 427/387, 389, 389.9; 525/477, 478; 528/33, 34, 37, 38

[56] References Cited

U.S. PATENT DOCUMENTS

| | | | |
|---|---|---|---|
| 3,398,017 | 8/1968 | Baurain et al. | 117/123 |
| 3,962,500 | 6/1976 | Smith | 427/387 |
| 4,128,675 | 12/1978 | Rössler et al. | 427/390 |
| 4,277,382 | 7/1981 | Lin et al. | 428/447 |
| 4,390,650 | 6/1983 | Deiner et al. | 524/266 |
| 4,403,886 | 4/1995 | Chrobaczek et al. | 106/287.11 |
| 4,509,981 | 4/1985 | Sanders, Jr. et al. | 106/287.11 |
| 4,559,385 | 12/1985 | Hahn | 524/838 |
| 4,680,366 | 7/1987 | Tanaka et al. | 106/287.12 |
| 4,844,888 | 7/1989 | Zawadzki | 106/287.11 |
| 4,973,620 | 11/1990 | Ona et al. | 106/287.11 |
| 5,025,076 | 6/1991 | Tanaka et al. | 528/33 |
| 5,057,572 | 10/1991 | Chrobaczek et al. | 524/588 |
| 5,110,684 | 5/1992 | Cooper | 428/447 |
| 5,196,260 | 3/1993 | Dirschl et al. | 428/490 |
| 5,205,860 | 4/1993 | Narula et al. | 106/2 |
| 5,209,775 | 5/1993 | Bank et al. | 106/2 |
| 5,300,327 | 4/1994 | Stark-Kasley et al. | 106/2 |
| 5,409,620 | 4/1995 | Kosal et al. | 106/287.15 |
| 5,411,585 | 5/1995 | Avery et al. | 106/287.11 |

FOREIGN PATENT DOCUMENTS

| | | |
|---|---|---|
| 0156970 | 10/1985 | European Pat. Off. . |
| 0370326 | 5/1990 | European Pat. Off. . |
| 0515915 | 12/1992 | European Pat. Off. . |
| 2459936 | 6/1975 | Germany . |
| 3035824 | 9/1988 | Germany . |
| 3730780 | 11/1990 | Germany . |

OTHER PUBLICATIONS

Derwent Abstract, 89–094529 (DE 3730780).
Derwent Abstract 75–44776w (DE 2459936).

*Primary Examiner*—Anthony Green
*Attorney, Agent, or Firm*—Kevin T. Mansfield

[57] ABSTRACT

Compositions in the form of aqueous dispersions which contain dihydroxypolyorganosiloxanes, amino-functional silanes and cyclic oligosiloxanes and/or reaction products of these components, are suitable for coating sheet materials made of fiber materials. This confers, to the sheet materials, good waterproofness properties with good permanency of the waterproofness, good low-temperature flexibility and springiness.

9 Claims, No Drawings

COMPOSITIONS, CONTAINING ORGANIC SILICON COMPOUNDS, FOR THE TREATMENT OF FIBRE MATERIALS

This application is a continuation, of application Ser. No. 08/303,906 filed Sep. 9, 1994, now abandoned.

The invention relates to compositions in the form of aqueous dispersions which, in addition to water and one or more dispersants, contain three or more organic silicon compounds of specific structures. It further relates to a method for coating fiber materials with the use of said compositions.

It is known to treat fiber materials in the form of sheet materials such as, e.g., nonwovens, bonded fiber webs, woven or knitted fabrics, with compositions which contain organic silicon compounds, in particular organopolysiloxanes. The application of the compositions to the sheet materials made of fiber materials can be chosen in accordance with various methods. Which method is carded out in a particular case depends, inter alia, on the desired properties of the articles. If good waterproofness of the fiber materials is to be achieved, it is advisable to apply the compositions containing organopolysiloxane by means of coating processes to the sheet materials made of fiber materials. It is also often advantageous to generate continuous films having good waterproofness on the fiber materials by employing compositions for coating, which are present on the fiber materials in the form of cross-linked polymer structures.

The coating of sheet materials made of fiber materials with compositions containing organopolysiloxanes is known from the prior art. Thus, EP-A 370 326 describes the use of copolymers of organosiloxanes and acrylates. U.S. Pat. Nos. 3,398,017 and 4,128,675 likewise deal with coating using copolymers. DE-A-37 30 780 discloses coating by employing polyurethanes.

The compositions known from the prior art have drawbacks. The use of polyacrylates, polyurethanes or copolymers which, in addition to organopolysiloxanes, also contain substantial proportions of acrylate or urethane units may result in undesirable thermomigration of disperse dyes in the coated fiber materials. The springiness, ie shape retention and shape recovery of the fiber materials after mechanical loading, is nonoptimal when acrylate or polyurethane structures are used on their own or in mixtures.

The low-temperature flexibility of the coated materials, if products containing polyurethane but particularly polyacrylate are used, is inadequate, since the corresponding layer present on the surface of the fiber materials becomes stiff and brittle at low temperatures. Cracking of this layer, which has low flexibility in the cold, results in a loss of waterproofness of the coating.

Because of the mentioned drawbacks of compositions containing polymers or copolymers having substantial proportions of acrylate or urethane units, attempts were made previously to develop compositions which are free of products having acrylate or urethane units. The aim in this case was to employ products which contain polymers which consist entirely or predominantly of organosiloxane units. For example, experiments were carried out with organopolysiloxanes in organic solvents. The drawback of such formulations consists in the costs and environmental aspects owing to the use of organic solvents. Attempts to employ said organopolysiloxanes in the form of aqueous dispersions failed on the grounds that, without the addition of relatively high amounts of dispersants and of further polymers such as polyacrylates, polyurethanes or poly(vinyl alcohol), stable aqueous dispersions or waterproof films, respectively, were not obtained.

Finally, U.S. Pat. No. 4,277,382 describes compositions containing organopolysiloxane for coating non-sheetlike glass fiber materials such as glass fiber cables, or metal surfaces. The compositions specified there have drawbacks, however, if they are used for coating sheetlike fiber materials made of organic polymers such as, e.g., textile sheet materials. Thus, firstly, relatively high temperatures are required for curing or cross-linking such products. Secondly, the permanency of the waterproofness achieved on textile sheet materials is nonoptimal.

In order to reduce the drawbacks mentioned of products known from the prior art, the object of the present invention is to develop compositions which are well-suited for coating fiber materials in the form of non-wovens (bonded fiber webs), woven or knitted fabrics. These compositions are to result in good waterproofness, good permanency of the waterproofness, good low-temperature flexibility and good springiness of the coated fiber materials. The undesirable thermomigration of disperse dyes, which occurs in compositions known from the prior art, is to be prevented or at least distinctly reduced by the use of the novel compositions. Furthermore, the compositions to be developed are to be present as stable, aqueous dispersions which are free or virtually free of organic solvents, and after coating of the fiber materials and curing they are to result in waterproof coatings which, as the polymer components, contain products free or essentially free of acrylate, polyurethane and poly(vinyl alcohol) units.

The object was achieved by a composition in the form of an aqueous dispersion which contains water and the following components a) an organopolysiloxane or a mixture of organopolysiloxanes of the formula (I)

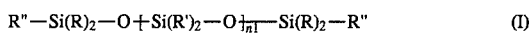

$$R''-Si(R)_2-O+Si(R')_2-O\overline{]_{n1}}-Si(R)_2-R'' \qquad (I)$$

in which the radicals R' independently of one another, are R or $-[O-Si(R)_2\overline{]_{n2}} O Si (R)_2-R''$, and the radicals R", independently of one another, are R, OH or OR, at least two of all the radicals R" present being OH or OR, in which n1 and n2 have values such that the viscosity of said component a) has a value of from 100 to 100,000, preferably from 1000 to 10,000 mPa.s at 20° C., b) a cyclic organosiloxane or a mixture of cyclic organosiloxanes of the formula (II)

$$[Si (R)_2 O]_x \qquad (II)$$

in which x is a number from 3 to 8, preferably 3 or 4 c) a silane or a mixture of silanes of the formula (III)

$$YX_2Si+CHZ\overline{]_p}NH+[(CHZ)_w NH\overline{]_q}H, \qquad (III)$$

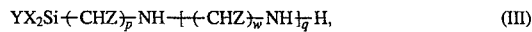

in which p is a number from 2 to 6 and q is a number from 0 to 7, preferably from 1 to 3, w is a number from 2 to 6, and in which all the radicals X, independently of one another, are a radical RO-(CHZ—CHZ—O-)$_t$ or a radical R or HO-(CHZ—CHZ—O-)$_t$, in which t is a number from 0 to 8, Z is H or $CH_3$, and Y is X or $-(CHZ)_p-NH-[-(CHZ)-]_w NH-]_q H$, d) a dispersant or a mixture of dispersants, preferably at least one cationic dispersant being present, and, if required, e) a silane or a mixture of silanes of the formula (IV)

$$[R'''O{+}CHZ-CHZ-O{)}_{\overline{t/2}}]-SiX_2 \qquad (IV)$$

or a product which is formed from said silane or said mixture of silanes in the presence of water by hydrolysis and subsequent condensation with the elimination of water, in which all the radicals X, independently of one another, and Z and t have the abovementioned meanings and wherein R''' is H or R, with the proviso that the composition contains at least one component c) or e) which has at least one Si atom, to which three or four radicals of the formula RO{+}CHZ—CHZ—O{)}_{\overline{t}} or the formula HO{+}CHZ—CHZ—O{)}_{\overline{t}} are connected, all the radicals R present in the components a), b), c) and e) being, independently of one another, alkyl radicals having from 1 to 4 C atoms, or phenyl radicals, the composition containing the components a), b), c) and, if present, e), either only as such, or in addition thereto or exclusively, in the form of products which are formed by partial or complete reaction of two or more of said components with one another.

The compositions according to the invention have the following advantages:

1. They are eminently suitable for coating sheet materials made of fiber materials, the compositions, for the purpose of the coating process, normally additionally containing conventional known thickeners and, if appropriate, further products described below in more detail. The coated sheet materials such as, e.g., nonwovens, but in particular woven and knitted fabrics, after curing (cross-linking) of the coating have good waterproofness with good permanency. These sheet materials are suitable for use in garment textiles, domestic textiles or industrial articles. Examples for particular applications are tarpaulins, tent canvasses, rain garments, shower curtains.

2. If compositions according to the invention are used for coating fiber materials, the risk of thermomigration of disperse dyes is distinctly lower than if known compositions are used which contain polyacrylates, polyurethanes, poly(vinyl alcohols) in substantial amounts or copolymers with substantial proportions of units based on acrylates or of urethane units. For this reason, the compositions according to the invention preferably do not contain polyacrylates, polyurethanes, poly(vinyl alcohols) or copolymers with substantial proportions of acrylate units or urethane units. Should, in a particular case, for special reasons, polymeric products containing acrylate or urethane units nevertheless be desired, in addition to the components a) to e), in the compositions according to the invention, their amount should not exceed 10% by weight, based on the sum of components a), b), c) and e).

3. The sheet materials, made of fiber materials, coated using compositions according to the invention have good springiness and good low-temperature flexibility. Their shape retention and shape recovery after mechanical loading, in particular, is distinctly improved compared with the shape retention and shape recovery properties achieved with known compositions based on acrylate or urethane.

4. Compared with textile sheet materials which have been coated with compositions based on acrylate, sheet materials which have been coated using compositions according to the invention, have a pleasantly soft handle and no tackiness or distinctly reduced tackiness.

5. Compositions according to the invention can be obtained in the form of stable aqueous dispersions even at high concentrations of up to 50% by weight, exceptionally even up to 60% by weight; addition of organic solvent is nor required, which results in advantages in terms of costs and the environment. Preferably, compositions according to the invention are therefore entirely free of organic solvents or contain organic solvents only in amounts of up to at most 5% by weight, based on the total composition.

6. Compositions according to the invention, which are present in the form of aqueous dispersions, can be combined with organopolysiloxanes (H-siloxanes) which have silicon-hydrogen bonds, particularly if a pH of the H-siloxane-containing composition according to the invention of from 2 to 5 is maintained in the process. The additional use of said H-siloxanes, described below in more detail, often results in a further increase of the permanency of the waterproofness of the coating after cross-linking. The term permanency mentioned here and above is to be understood as the degree of retention of the waterproofness after laundering the fiber material 5 times at 60° C. Because of the known reactivity of the Si—H bond in an aqueous medium, the aqueous dispersions containing H-siloxane are, admittedly, stable only for a limited time, so that, expediently, the H-siloxane is admixed to the compositions according to the invention, present as aqueous dispersions, only a short time, ie not more than a few hours, before the coating operation.

Compositions according to the invention are aqueous dispersions which contain at least one each of the components a), b), c) and d) mentioned above and described below in more detail. In addition, the compositions may also contain a component e) of the type likewise described below in more detail. The components a), b), c) and, if desired, e) may be present as such in the compositions according to the invention, ie in each case in the form of a product of the structure described in the formulae I, II, III and IV. It is also possible, however, for products to be present, instead of the individual components or in addition thereto, which are obtained by partial or complete reaction of two or more of the components a), b), c) and e) with one another. The compositions according to the invention must, however, contain each of the components a), b), c), either as an individual substance or in the form of a reaction product which is formed from this component and one or more of the other components a), b), c) or e). In addition, the compositions according to the invention must also contain component d), the latter, however, not in the form of a reaction product.

The reaction products of two or more of the components a), b), c) and e) with one another, which may be present in the compositions according to the invention in addition to, or instead of, the individual components, may, as one option, be used deliberately in the preparation of the compositions. This can be effected by two or more of the components a), b), c) and e) being reacted with one another, partially or completely, and the reaction product thus obtained being used in the preparation of a composition according to the invention. Such products from a partial or complete reaction may, however, also form spontaneously in compositions according to the invention which are prepared using the individual components a), b), c) and, if desired, e) which have not been reacted with one another. Such a reaction after the preparation of a composition according to the invention in the form of an aqueous dispersion may, in particular, take place from the time at which the dispersion is admixed with a cross-linking catalyst. If such a reaction is desirable before the preparation of the composition according to the invention, this preferably involves a partial reaction of two or three of the components b), c) and e) amongst one another. Partial reaction in this context means that up to 50% of the theoretically possible amount of reaction products have been formed. It is also possible for compositions according to the invention to contain products which are formed by reaction of a compound of the formula (I) (component a)) with a compound of the formula (III) (component c)) or with a compound of the formula (IV) (component e)).

The component a):

This is an organopolysiloxane of the abovementioned formula (I) with a branched or unbranched polysiloxane chain which, on at least two terminal Si atoms has one hydroxyl group or one group OR. All the radicals R specified in formula (I) are, independently of one another, in each case alkyl radicals having from 1 to 4 carbon atoms, or phenyl radicals. Preferably, all the radicals R are methyl or ethyl radicals, methyl radicals being preferable with respect to ethyl radicals on the grounds of cost. The statement according to which methyl radicals or ethyl radicals are preferred as the radicals R applies not only to component a), but also to the components b), c) and e).

In the formula (I) specified for component a), all the radicals R' are, independently of one another, a radical R or a radical of the formula

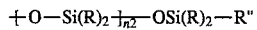

Preferably, all except one, or all the radicals R', are a radical R. In the latter case, the component a) is a compound or a mixture of compounds having an unbranched polysiloxane chain. Bound to all the terminal silicon atoms of the compounds of the formula (I), there are two radicals R, all the radicals R having, independently of one another, the above-specified meaning. Furthermore, there is bound to each terminal silicon atom a radical R". All the radicals R" present are, independently of one another, a radical R, OH or OR. At least two of the radicals R" must, however, be OH or OR, R again having the said meaning, in particular being $CH_3$ or $C_2H_5$. The two radicals R" which must be OH or OR, may be identical or different, one of these radicals can, for example, be OH and the other OR, in particular $OCH_3$ or $OCH_2CH_3$. The requirement that at least two of the radicals R" must be OH or OR results from the fact that said bifunctionality is required for subsequent cross-linking, OH groups being directly capable of cross-linking, and OR groups after hydrolysis in an aqueous medium.

The length of the branched or unbranched polysiloxane chain in component a), which is defined by the values of n1 and n2, must be chosen in such a way that the component a) has a viscosity, at 20° C., in the range of from 100 to 100,000 mPa.s. Particularly favorable results in terms of handling and use of the dispersions, or properties of the coated fiber materials, are obtained if n1 and n2 are chosen in such a way that the viscosity is in the range from 1000 to 10,000 mPa.s. Instead of a single organopolysiloxane, component a) may also be a mixture of organopolysiloxanes which come under formula (I) and meet the abovementioned conditions.

If component a) has a viscosity in the said range, the individual values of n1 and n2 can be chosen freely, e.g., n2 may also be 0, but n1 must be a number of 1 or greater than 1.

Polysiloxanes suitable as component a) are known to those skilled in the art from the prior art, e.g. from the German Patent No. 30 35 824, the German Published Application No.24 59 936 and EP-A-515 915. Suitable representatives of such products are commercially available, examples being the products Baysilone oil T 5 (manufactured by Bayer AG, Germany) and silicone oil CT 5000 M (manufactured by Wacker GmbH, Germany).

The component b):

Component b) is a cyclic organosiloxane or a mixture of cyclic organosiloxanes of the abovementioned formula (II). In this formula, all the radicals R present have the above-specified meaning, all the radicals R preferably being methyl radicals. The number x specifies which, the number of the Si atoms in the siloxane ring, has a value of from 3 to 8. Preferably, x has the value 3 or 4; preferred representatives of the component b) are octamethylcyclotetrasiloxane or hexamethylcyclotrisiloxane or a mixture of these two compounds.

The products coming under formula (II) have long been known to those skilled in the art and are commercially available. Suitable commercial products may, in addition to cyclic siloxanes, also contain open-chain oligosiloxanes as by products. Said open-chain oligosiloxanes may therefore also be present as by-products in compositions according to the invention.

The component c): Component c) is a silane or a mixture of silanes of the above-specified formula (III). All the silanes suitable as component c) contain one or two (if Y is not X) substituent(s) bound to the silicon atom, which has (have) a primary amino group. In addition, one or more secondary amino group(s) may be present in said substituent(s) (q in formula (III) has a value of from 0 to 7). Preferably, each amino-functional substituent bound to the Si atom has one, two or three secondary amino groups, ie q preferably has a value of from 1 to 3. The number p of the groups of the formula CHZ present between the Si atom and the first amino group, is from 2 to 6, preferably from 2 to 3. Each of the radicals Z present here is either hydrogen or a methyl group, preferably all the radicals Z are hydrogen. Component c) contains one or two radicals, bound to the Si atom, of the formula $-(CHZ)_p NH-[-(CHZ)_w NH-]_q$, ie one such radical if, in formula (III), Y is X, and two if Y is not X. In this formula, all the radicals Z present have, independently of one another, the abovementioned meaning, w is a number from 2 to 6, preferably the number 2, and q is a number from 0 to 7, preferably from 1 to 3.

In addition to one or two substituents, each having one or more amino groups, there are bound, to the Si atom of component c), two or three radicals X. These may be identical or different from one another. Two radicals X are present in component c) if the radical Y bound to the Si atom is not X, three radicals X being bound to the Si atom if Y is X. Each substituent X is either a radical R of the type described above in the context of component a), but preferably a radical of the formula $RO-(CHZ-CHZ-O)_t-$ or the formula $HO-(CHZ-CHZ-O)_t-$ in which R again has the said meaning, Z is H or $CH_3$, preferably H, and t is a number from 0 to 8. The radicals R are again preferably methyl radicals or ethyl radicals. If X is R, a methyl group is, in particular preferred as the radical R, if X is $RO-(CHZ CHZ O)_t$, R is preferably an ethyl group.

The radical Y, bound to the silicon atom of component c) in addition to two radicals X and the amino functional radical described, preferably is a radical X, X having the abovementioned meaning. Alternatively, Y may, however, be an amino-functional substituent of the type already described, ie

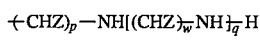

Suitable amino functional silanes which can be used as component c) are known to those skilled in the art. Products which can be employed as component c) are commercially available, e.g. Dynasylan® 1411, Dynasylan® 1505 and Dynasylan® TRIAMO from Häls AG, Marl, Germany.

If the compositions according to the invention do not contain a component e) of the type described below in more detail, a component c) must be present in which Y is X and in which all 3 radicals X present are each a radical of the formula RO—(CHZ CHZ O)$_t$ or the formula HO—(CHZ—CHZ—O)$_t$. The same applies if a component e) is indeed present but has fewer than three radicals of the formula RO—(CHZ CHZ O)$_t$ or the formula HO—(CHZ—CHZ—O)$_t$. If a component e) having three or four radicals of the formula RO—(CHZ CHZ—O)$_t$ or the formula HO—(CHZ—CHZ—O)$_t$ is present, on the other hand, fewer than three radicals of the formula RO—(CHZ CHZ O)$_t$ or the formula HO—(CHZ—CHZ—O)$_t$ can be present in component c). The requirement according to which at least one silane having three or four radicals of the formula RO—(CHZ CHZ O)$_t$ or the formula HO—(CHZ—CHZ—O)$_t$ must be present is related to the fact that only in this case adequate cross-linking of the coating on the fiber materials and therefore only in this case an adequately waterproof coating with good permanency is achieved.

The component d):

Component d) of the compositions according to the invention is a dispersant. It is also possible to use a mixture of different dispersants. The presence of one or more dispersants is required so that the compositions according to the invention are stable aqueous dispersions. Preferably, at least one of the dispersants used is cation-active. Products can be employed for this purpose which are known to those skilled in the art as being suitable for the preparation of stable aqueous dispersions, e.g. quaternized ammonium salts, e.g. quaternized fatty amines, quaternized salts of fatty acid amides or fatty acid alkanol amides which, in addition to amido groups, also contain amino groups. The corresponding anions of these salts are preferably $Cl^-$, $CH_3SO_4^{31}$, $SO_4^{2-}$, phosphate, phosphonate or acetate artions. Instead of, or in addition to, one or more cation-active dispersants, the compositions according to the invention may also contain one or more nonionogenic dispersants. Suitable examples include generally known representatives of the classes of compounds of ethoxylated fatty alcohols, ethoxylated fatty amines and ethoxylated fatty acids, e.g. those having from 8 to 18 carbon atoms in the fatty alcohol, fatty amine or fatty acid radical and from 2 to 40 polyoxyethylene units. Ethoxylated polyamines, such as ethoxylated stearyldiethylenetri-amines having from 2 to 40 polyoxyethylene units may likewise be used.

The component e):

Component e) is a silane or a mixture of silanes of the above-specified formula (IV), ie the formula [R'''—O—(CHZ CHZ—O)$_{t-1/2}$ SiX$_2$. In this formula, R''' is H or R, and the two radicals X are, independently of one another, each a radical R or R'''O—(CHZ CHZ O)$_t$, the radicals R are, independently of one another, each an alkyl radical having from 1 to 4 C atoms or a phenyl radical, t is a number from 0 to 8. If X is R, said radical R is preferably a methyl or ethyl radical, the methyl radical being particularly preferred. If R''' is R, said radical R is likewise preferably a methyl or ethyl radical. If the above-described component c) of a composition according to the invention does not contain a silane of the formula (III) in which Y is X and in which all three radicals X present are RO—(CHZ CHZ O)$_t$ or HO—(CHZ—CHZ—O)$_t$, said composition must contain a component e), and said component e) must contain a silane in which three or four radicals of the formula RO—(CHZ—CHZ—O)$_t$ or the formula HO—(CHZ—CHZ—O)$_t$ are bound to the Si atom. If component c), however, does contain a silane of the formula (III) in which three radicals X are present and are RO—(CHZ CHZ O)$_t$ or HO—(CHZ—CHZ—O)$_t$, a component e) can additionally be present, but it need not be present. In this case, a component e) may further be present in which only two radicals of the formula R'''—(CHZ CHZ O)$_t$ are bound to the Si atom, whereas the two radicals X each are a radical R.

Products suitable as component e) are, e.g., triethoxymethylsilane, triethoxyethylsilane, dimethoxydimethylsilane, dimethoxydiethylsilane, diethoxydimethylsilane or diethoxydiethylsilane. The commercially available tetraethoxysilane is also suitable.

Instead of a silane or mixture of silanes of the formula (IV) as such, or in addition thereto, it is also possible to use, as component e), a product or product mixture which is formed from a silane or a mixture of silanes of the formula (IV) in the presence of water by hydrolysis and subsequent condensation with the elimination of water. In the presence of water, silanes of the formula (IV) may initially give rise, by hydrolysis, to products having three or four Si—OH bonds which, with elimination of water (condensation), may react further to give cross-linked siloxane structures. Such products are commercially available as polyethoxysilanes, for example.

The compositions according to the invention contain the components a) to e) preferably in the following relative quantitative ratios, the following specifications being based on anhydrous products in each case.

a) from 10 to 70 pans by weight, preferably from 40 to 70 parts by weight b) from 10 to 70 parts by weight, preferably from 25 to 60 parts by weight c) from 0.1 to 10 parts by weight, preferably from 0.2 to 3 pans by weight d) from 0.1 to 10 parts by weight, preferably from 0.5 to 3 pans by weight e) from 0 to 10 parts by weight.

The weight ratio of water to the sum of the components a), b), c) and e) is preferably from 2:1 to 1:1. The amount of component d) (dispersant or dispersant mixture) is preferably from 0.5 to 3% by weight, based on the total dispersion. It is further preferable for the sum of the components a), b), c) and e) to represent the predominant constituent by far of the compositions according to the invention except for water, particularly for this sum to form from 75 to 95% by weight of all the constituents present in the dispersion except for water. The remaining constituents, preferably present in amounts of up to at most 25% by weight, are component d) (dispersant) and, if desired, further constituents which are described below.

For the purpose of coating sheet materials made of fiber materials, the aqueous dispersions which contain the components a), b), c), d) and, if desired, e), are normally admixed with a thickener, since aqueous dispersions having low viscosity are not suitable for coating purposes. After addition of the thickener, high-viscosity to paste-like products are formed with which textile sheet materials can be coated, e.g. via knife coating. Said high-viscosity products or pastes are likewise aqueous dispersions within the scope of the invention. The designation "aqueous dispersion" for the compositions according to the invention does not, therefore, comprise only liquid or flowable products.

Products suitable as thickeners for coating processes are known to those skilled in the art. All the conventional thickeners may, in principle, be constituents of compositions according to the invention, provided they do not result in separation of the constituents of the composition and thus to inhomogeneity thereof. A particularly suitable thickener is hydroxyethylcellulose. The amount of thickener which is added expediently may vary, those skilled in the art will need only a few routine tests to determine the optimum amount which, normally, is in the order of magnitude of from 0.1 to 3% by weight, based on the overall composition.

In order to achieve good cross-linking of the components a), b), c) and, if desired, e) on the fiber materials and thus to obtain waterproof films, the compositions according to the invention preferably contain one or more cross-linking catalysts. Suitable cross-linking catalysts are known to those skilled in the art from silicone chemistry. Metal salts of organic carboxylic acids, particularly tin salts such as dialkyltin (IV) salts are suitable. The addition of the cross-linking catalyst may take place either just before coating the fiber materials or it is possible to add cross-linking catalysts even during the preparation of compositions according to the invention. In this case, partial pre-cross-linking of two or more of the components a), b), c) and, if desired, e) may already take place in the aqueous dispersion. In some cases, said pre-cross-linking may be desirable because of an increase in viscosity, and may be induced deliberately.

Apart from the additions already mentioned, the compositions according to the invention may also contain products which effect an improvement in the adhesion of the cross-linked polymeric silicon compounds (which are formed from the components a), b), c) and, if desired, e)) on the fiber materials.

Moreover, products may be contained in the compositions according to the invention, which effect protection against corrosive properties, such as, e.g., phosphoric acid or its salts, and products which serve to set the desired pH, such as, e.g., acetic acid, oxalic acid or sodium hydroxide.

Each of the abovementioned additions is preferably present in amounts of less than 10% by weight, based on the overall composition. The amount of thickener is preferably from 0.1 to 3% by weight, the amount of cross-linking catalyst preferably from 0.3 to 1.0% by weight, the amount of adhesion enhancer preferably from 0.5 to 8% by weight, the amounts of anticorrosive agent and of product for setting the pH preferably from 0.3 to 1% by weight each. All the amounts specified are based on overall composition.

The pH of compositions according to the invention is preferably in the range from 3.0 to 9.0 at 20° C. This range is preferred only, however, if a composition according to the invention does not contain a product which has silicon-hydrogen bonds. If such a product, as described below in more detail, is present, however, the pH then is preferably from 2.0 to 5.0 at 20° C., the reason being that in this range the Si—H bonds are chemically more stable than in other pH ranges.

The preparation of compositions according to the invention can be carried out by known methods well-known to those skilled in the art. It is possible, for example, to introduce water as the initial charge, to which the components a) to d), or a) to e) and, if desired, further products are added in any order. It is also possible to introduce, as the initial charge, a mixture of water and dispersant or dispersant mixture, to which, with stirring, the components a), b), c) and, if desired, e) are added. Homogenization which results in stable aqueous dispersions can be carried out at room temperature or elevated temperature and, if appropriate, under elevated pressure in known equipment.

In a preferred embodiment, two aqueous dispersions A and B are first prepared separately and these dispersions are then combined to obtain a composition according to the invention. The composition thus obtained may then be admixed with a thickener and, if desired, further products in order to obtain a composition, e.g. in the form of a paste, with which fiber materials can be coated. The separate preparation mentioned of two dispersions A and B is advantageous in a number of cases, because it may result in enhanced stability of the composition according to the invention obtained after combining A and B. If this method of the separate preparation of a dispersion A and a dispersion B is chosen, dispersion A contains water, one or more dispersants and component a). It does not, however, contain the components b), c) and e), or contains them only in insignificant amounts. "Insignificant amounts of components b), c) and e)" in this context is to be understood as each of these components being present in such amounts, at most, that at most 20% of the amount of component a) are able to react with component b), c) or e) or the mixture of these components. The chemical reaction of at least 80%, preferably from 90 to 100% of the total amount of component a) present in dispersion A, with the components b), c) and, if desired, e) present in dispersion B should therefore be able to take place only after the combination of dispersion A with dispersion B. Dispersion B contains water, one or more dispersants and the components b), c) and, if desired, e). The component a), however, is not present in dispersion B or is present only in insignificant amounts. The statement "insignificant amounts" means, in analogy to the above specifications, that at most 20%, preferably from 0 to 10% of the sum of components b), c) and e) are able to react with the component a), present in dispersion B. Instead of the components b), c) and e) as such, or in addition to these, the dispersion B may, however, also contain products which are formed by reaction of two or three of said components with one another. This may be the case, in particular, if the dispersion B contains a cross-linking catalyst.

The dispersant contained in dispersion A may be the same as the one contained in dispersion B, but may alternatively be different. This also applies to the case of a mixture of dispersants being used.

The compositions according to the invention have long shelf lives and are eminently suitable for coating sheet materials made of fiber materials. Preferred fiber materials are nonwovens (bonded fiber webs) and, in particular, woven or knitted fabrics. Particularly good results are obtained in coating sheet materials made of fiber materials which consist of natural, partly synthetic or fully synthetic organic polymers. Mixtures of fibers of these polymers may likewise be used. If natural polymers are to be used, possible articles include those made of linen and cellulose, e.g. cotton. Suitable sheet materials made of partly synthetic polymers are articles made of regenerated cellulose, possible fully synthetic polymers are, for example, polyesters or polyamides.

Coating of the sheet materials made of fiber materials can be carried out according to generally known methods, for example via knife coating. To this end, the compositions according to the invention are normally used in the form of aqueous dispersions which contain a thickener and are present as paste-like products.

In a preferred embodiment of the method for coating fiber materials, using compositions according to the invention, in addition to the composition according to the invention, there is also applied to the fiber materials an organopolysiloxane which has two or more hydrogen atoms bound to one silicon atom each, ie two or more Si—H bonds. These organopolysiloxanes, also known as H-siloxanes, may confer onto the coating enhanced permanency after laundering processes. At least two Si—H bonds are desirable to achieve good cross-linking of said H-siloxanes with the components a), b), c) and, if desired, e). Suitable H-siloxanes are known products having a linear polysiloxane chain, in which two or more Si atoms each have a hydrogen atom bound to them. Particular preference is given to products of the formula $(CH_3)_3Si$—$O$—$[Si(CH_3)(E)$—$O$—$]_rSi(CH_3)_3$, in which two or more of the radicals E are hydrogen and all the remaining radicals E are $CH_3$. Preferably, not more than 20% of all the radicals E are $CH_3$. The value of r is preferably in the range from 20 to 60, but may also be larger or smaller. Suitable H-siloxanes are commercial products, e.g. the product Baysilon® MH 15 (manufactured by Bayer AG, Germany).

The H-siloxane may be added directly to the compositions according to the invention. In this case, the pH of the composition is preferably in the range from 2.0 to 5.0, since in this range the chemically reactive Si—H bond has the greatest stability. Because of the reactivity of the Si—H bond which may result in instability of the aqueous dispersion and evolution of gas during storage, and because of the hydrolysis of the Si—H bond it is advisable to add the H-siloxane to the composition according to the invention only relatively shortly before carrying out the coating process. This relatively short time is between a few minutes up to 10 hours.

Alternatively, the H-siloxane may be applied to the fiber materials in a separate operation before or after carrying out the coating process. In this case, the H-siloxane is preferably applied by padding. To this end, the H-siloxane is employed, for example, in the form of an aqueous dispersion having a weakly acidic pH of from 2 to 5. This dispersion may contain, as the dispersant, a cation-active or nonionogenic surface-active product of the abovementioned type. Such dispersions are commercial products.

Irrespective of whether the H-siloxane is applied to the fiber materials before or after or at the same time as a composition according to the invention, expediently from 1 to 5 parts by weight of H-siloxane per 100 parts by weight of the sum of the components a), b), c), and e) are used. These numbers in each case relate to anhydrous products.

For the purpose of cross-linking the components a), b), c) and, if desired, e) and H-siloxane with one another, the coated sheet materials made of fiber materials are subjected to drying and a thermal treatment. Drying and thermal treatment, the latter ensuring cross-linking to completion, can be carried out simultaneously or successively. The thermal treatment is preferably carried out in a temperature range of from 110 to 180° C. for a time of from 1 to 5 minutes. The setting of temperature and treatment time depend, inter alia, on the coating system used. In the case where, after coating with a composition according to the invention, a H-siloxane is additionally applied to the fiber materials in a separate operation, it is advisable to carry out the thermal treatment, during which complete cross-linking takes place, only after the H-siloxane has been applied.

The fiber materials may, if desired, be pretreated in accordance with known methods, before compositions according to the invention are applied; for example, this may involve the application, by padding, of products to the fiber materials, which are conventionally used in the treatment of fiber materials.

The invention will now be illustrated by means of specific examples.

EXAMPLE 1

Preparation of an aqueous dispersion A An aqueous solution which contains 19 g of an ethoxylated amine and 13 g of the cationic salt formed from this amine after quaternization with dimethyl sulfate, and 52 g of water, was admixed slowly with 2600 g of Baysilone® oil T 5 with kneading by means of a screw at room temperature. The ethoxylated amine used was a product which is formed from a mixture of technical-grade amines of the formula

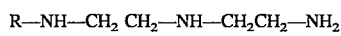
R—NH—CH$_2$ CH$_2$—NH—CH$_2$CH$_2$—NH$_2$ after ethoxylation with an average of 18 mol of ethylene oxide per mole of amine. The radical R was a saturated fatty acid radical having, on average, 18 C atoms. The product Baysilone® oil T 5 corresponds to the component a) described and is an unbranched α,ω-dihydroxypolydimethylsiloxane having a viscosity of approximately 5000 mPa.s at 20° C. A paste was obtained to which, with homogenization, 1.5 l of water was slowly added dropwise. This resulted in a milky dispersion which contained approximately 37% by weight of water.

EXAMPLE 2

Preparation of a dispersion B

A solution of 271 g of Ethoquad® C 12 (manufactured by AKZO Chemie, Germany) in 10.14 l of water was admixed with 6150 g of silicone oil Z 020 (octamethylcyclotetrasiloxane, Wacker GmbH, Germany) and 128 g of tetraethoxysilane and the mixture was then homogenized. This was followed by a high-pressure homogenization at approximately 60° C. Ethoquad® C 12 is a quaternized ethoxylated fatty amine (dispersant). Then, 308 g of Dynasylan® TRIAMO (component c)) were added with stirring. The mixture obtained was heated to 90° C. for 24 hours. This resulted in a milky dispersion which contained approximately 61% by weight of water.

EXAMPLE 3

Preparation of a composition according to the invention 232.5 g each of the dispersions prepared in accordance with Example 1 and 2 were mixed together at room temperature. The stable aqueous dispersion obtained was admixed, with stirring, with 20.5 g of aqueous 10% by weight hydroxyethylcellulose, followed by further stirring for approximately 3 hours. The composition obtained was admixed, with stirring, with 2.8 g of 40% by weight aqueous phosphoric acid, stirring being continued for a few more minutes.

EXAMPLE 4

Preparation of compositions for coating tests

The formulations 4a to 4h having the following compositions were prepared:
Formulation 4a (according to the invention):

| | |
|---|---|
| 100 | parts by weight of dispersion according to Example 3 |
| 4 | parts by weight of an approximately 20% by weight aqueous dispersion (cationic dispersant) of dioctyltin (IV) |

-continued

| | dilaurate, |
|---|---|
| 1 | part by weight of a 50:50 mixture of isopropanol and Dicrylan ® thickener O (Pfersee Chemie GmbH, Germany) hydroxyethylcellulose and water (10:90) |
| 1 | part by weight of 60% by weight acetic acid in water |

Formulation 4b (according to the invention)

| | |
|---|---|
| 105 | parts by weight of formulation 4a |
| 1.7 | parts by weight of a 40% aqueous dispersion of an H-siloxane. This H-siloxane was a linear polydimethylsiloxane having, on average, 45 Si—O units, in which approximately 50% of the methyl groups were substituted by hydrogen. The terminal groups were (CH₃)₃Si radicals. The H-siloxane dispersion contained a nonionic dispersant. |

Formulations 4c and 4d (comparative):

As formulation 4a, but not prepared with dispersion of Example 3, but with dispersion of Example 1 (formulation 4c) and of Example 2 (formulation 4d), respectively.

Formulations 4e and 4f (comparative):

As formulations 4c and 4d, but in each case 1.7 parts by weight of H-siloxane emulsion (as described with formulation 4b), in addition to 105 parts by weight of formulation 4c) and 4d), respectively.

Formulation 4g: (according to the invention)

As formulation 4 a) except that, instead of the Baysilone® oil T 5 described in Example 1, the product silicone oil CT 80 000 (Wacker GmbH, Germany) was used. Silicone oil CT is an unbranched α,ω-dihydroxypolydimethylsiloxane having a viscosity of approximately 80,000 mPa.s at 20° C.

Formulation 4h (according to the invention)

| | |
|---|---|
| 105 | parts by weight of formulation 4g, |
| 1.7 | parts by weight of H-siloxane dispersion (as described with formulation 4b)). |

EXAMPLE 5

Coating of woven cotton fabric

The formulations 4a to 4h were used to coat patterned woven cotton fabrics (plain-weave shirt material) having a weight per unit area of 100 g/m². The woven fabrics had been preimpregnated, by means of padding, with a fluorine-containing composition (Oleophobol® PF, Pfersee Chemic GmbH, Germany) (10 g of Oleophobol® PF, per 1 of liquor, liquor pickup approximately 90%), dried and stored for 1 day. Coating was carried out by means of a floating knife. After drying (120° C., 5 min) and condensation (150° C., 5 min), the add-on on the woven fabrics was:

with formulation 4a: approximately 20 g/m² of woven fabric with formulation 4b: approximately 20 g/m² of woven fabric with formulation 4c: approximately 35 g/m² of woven fabric with formulation 4d: approximately 20 g/m² of woven fabric with formulation 4e: approximately 35 g/m² of woven fabric with formulation 4f: approximately 20 g/m² of woven fabric with formulation 4g: approximately 20 g/m² of woven fabric with formulation 4h: approximately 20 g/m² of woven fabric The woven fabrics, coated, dried and treated at 150° C., had their waterproofness measured. This measurement followed the method of DIN 53886. The permanency of the waterproofness was determined by repeating the waterproofness test on the one hand after 5 domestic washes (40° C., 40 min, with the addition of detergent) and, on the other hand, after 3 dry cleaning processes (mixture of perchloroethylene, water and emulsifiers, 20° C./40 min).

Results:

Waterproofness

| Formulation | after condensation | after 5 washes | after dry cleaning |
|---|---|---|---|
| 4a | 170 | 100 | 100 |
| 4b | 210 | 150 | 160 |
| 4c | 80 | 60 | 15 |
| 4d | 180 | 20 | 15 |
| 4e | 130 | 80 | 100 |
| 4f | 190 | 20 | 20 |
| 4g | 180 | 100 | 100 |
| 4h | 200 | 150 | 150 |

In this table, higher numbers correspond to a greater waterproofness (the numbers indicate the height of the water column in mm above the woven fabrics, see DIN 53 886).

The results show that the formulations 4a), 4b), 4g) and 4h) according to the invention are clearly superior to the remaining formulations in terms of waterproofness and the permanency thereof.

We claim:

1. A composition in the form of an aqueous dispersion which contains water and the following components:

a) from 10 to 70 parts by weight of an organopolysiloxane or a mixture of organopolysiloxanes of the formula (I)

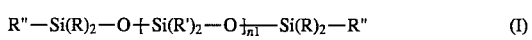

$$R''-Si(R)_2-O\mathord{+}Si(R')_2-O\mathord{\}_{n1}}-Si(R)_2-R'' \quad (I)$$

in which the radicals R' independently of one another, are R or $-[O-Si(R)_2]_{n2}OSi(R)_2-R''$, and the radicals R", independently of one another, are R, OH or OR, at least two of all the radicals R" present being OH or OR, in which n1 and n2 have values such that the viscosity of said component a) has a value of from 100 to 100,000 mPa.s at 20° C., b) from 10 to 70 parts by weight of a cyclic organosiloxane or a mixture of cyclic organosiloxanes of the formula (II)

$$[Si(R)_2O]_x \quad (II)$$

in which x is a number from 3 to 8, c) from 0.1 to 10 parts by weight of a silanes of the formula (III)

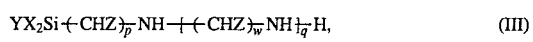

$$YX_2Si\mathord{+}CHZ\mathord{\}_p}NH\mathord{-}\mathord{+}CHZ\mathord{\}_w}NH\mathord{\}_q}H, \quad (III)$$

in which p is a number from 2 to 6 and q is a number form 0 to 7, w is a number from 2 to 6, in which all the racials X, independently of one another, are a radicial RO—(CHZ—CHZ—O)ᵣ or a radicial R or HO-(CHZ—CHZ—O)$_t$ in which t is a number from 0 to 8, Z is H or CH$_3$, and Y is X or -(CHZ)$_p$—NH-[-(CHZ)$_w$NH-]$_q$H, d) from 0.1 to 10 parts by weight of a dispersant or a mixture of dispersants, least one cationic dispersant or nonionic dispersant being present, and, optionally, e) from 0 to 10 parts by weight of a silane or a mixture of silanes of the formula (IV)

[R'''O-(-CHZ—CHZ—O-)$_{n2}$—SiX$_2$   (IV)

or a product which is formed from said silane or said mixture of silanes in the presence of water by hydrolysis and subsequent condensation with the elimination of water, in which all the radicals X, independently of one another, and Z and t have the abovementioned meanings and wherein R''' is H or R, with the proviso that the composition contains at least one component c) or e) which has at least one Si atom to which three or four radicals of the formula RO-(CHZ—CHZ—O-)$_t$ or the formula HO-(CHZ—CHZ—O-)$_t$ are connected, all the radicals R present in the components a), b), c) and e) being, independently of one another, alkyl radicals having from 1 to 4 C atoms or phenyl radicals, the composition containing the components a), b), c) and, if present, e) either only as such or, in addition thereto or exclusively, in the form of products which are formed by partial or complete reaction of two or more of said components with one another.

2. The composition as claimed in claim 1, wherein all the radicals R present in components a), b), c) and e) are methyl radicals or ethyl radicals.

3. The composition as claimed in claim 1, wherein the sum of the components a), b), c) and e) amounts to from 75 to 95% by weight of all the substances present in the composition, except water.

4. The composition as claimed in claim 1, which comprises the components a) to e) in the following relative quantitative ratios:
a) from 40 to 70 parts by weight,
b) from 25 to 60 parts by weight,
c) from 0.2 to 3 parts by weight,
d) from 0.5 to 3 parts by weight,
e) from 0 to 10 parts by weight.

5. A process for treating fiber materials, which comprises applying to the fiber materials a composition as claimed in claim 1.

6. The process as claimed in claim 5, wherein an aqueous dispersion A and an aqueous dispersion B are prepared separately and then combined, and wherein there is applied to a fiber material a coating which contains a composition thus obtained, the dispersion A containing a component a) and a dispersant or a mixture of dispersants, the dispersion A being essentially free of components b), c) and e), and the dispersion B containing a component b), a component c), a dispersant or a mixture of dispersants and, optionally, a component e), the dispersion B being essentially free of component a), it being possible for the dispersion B to contain the components b) and c) and, if present, e), either as such or in the form of products which are formed by partial or complete reaction of two or three of said components with one another, or a mixture thereof.

7. The process as claimed in claim 5, wherein the fiber materials are sheet materials in the form of nonwovens, woven or knitted fabrics which consist of natural, partly synthetic or fully synthetic organic polymers.

8. The process as claimed in claim 5, wherein said treating comprises applying a coating to the fiber materials.

9. The process as claimed in claim 8, wherein, in addition to the coating containing the composition, there is also applied to the fiber materials an organopolysiloxane which contains two or more hydrogen atoms bound to one silicon atom each, said additional organopolysiloxane being applied to the fibre materials before, after or simultaneously with the coating containing the coating composition.

\* \* \* \* \*